United States Patent [19]

Dunn

[11] 4,010,610
[45] Mar. 8, 1977

[54] HYDRAULIC LOAD-SENSING SYSTEM

[75] Inventor: Donnell Lynn Dunn, Terre Haute, Ind.

[73] Assignee: J. I. Case Company, Racine, Wis.

[22] Filed: Apr. 9, 1976

[21] Appl. No.: 675,587

[52] U.S. Cl. .................................. 60/459; 60/468
[51] Int. Cl.[2] ................... F16D 31/00; F15B 15/18
[58] Field of Search ............ 60/385, 386, 459, 461, 60/468; 91/421

[56] References Cited
UNITED STATES PATENTS

| | | | |
|---|---|---|---|
| 1,972,462 | 9/1934 | Schafer | 60/468 X |
| 3,568,868 | 3/1971 | Chichester | 60/459 |

Primary Examiner—Edgar W. Geoghegan
Attorney, Agent, or Firm—Arthur J. Hansmann

[57] ABSTRACT

A hydraulic load-sensing system including a pump, a valve, a load-responsive actuator, and a hydraulic pressure unloading valve, all hydraulically connected together. The outlet of the pump is directed to both valves, and a sensing port and hydraulic line exist between the two valves for communicating the hydraulic load pressure to the unloading valve and thereby establishing the pump outlet pressure. A biasing member is included in the unloading valve, and therefore a constant hydraulic pressure drop is established across the valve supplying fluid to the load-responsive actuator, and a pressure relief valve limits the outlet pressure of the pump.

8 Claims, 1 Drawing Figure

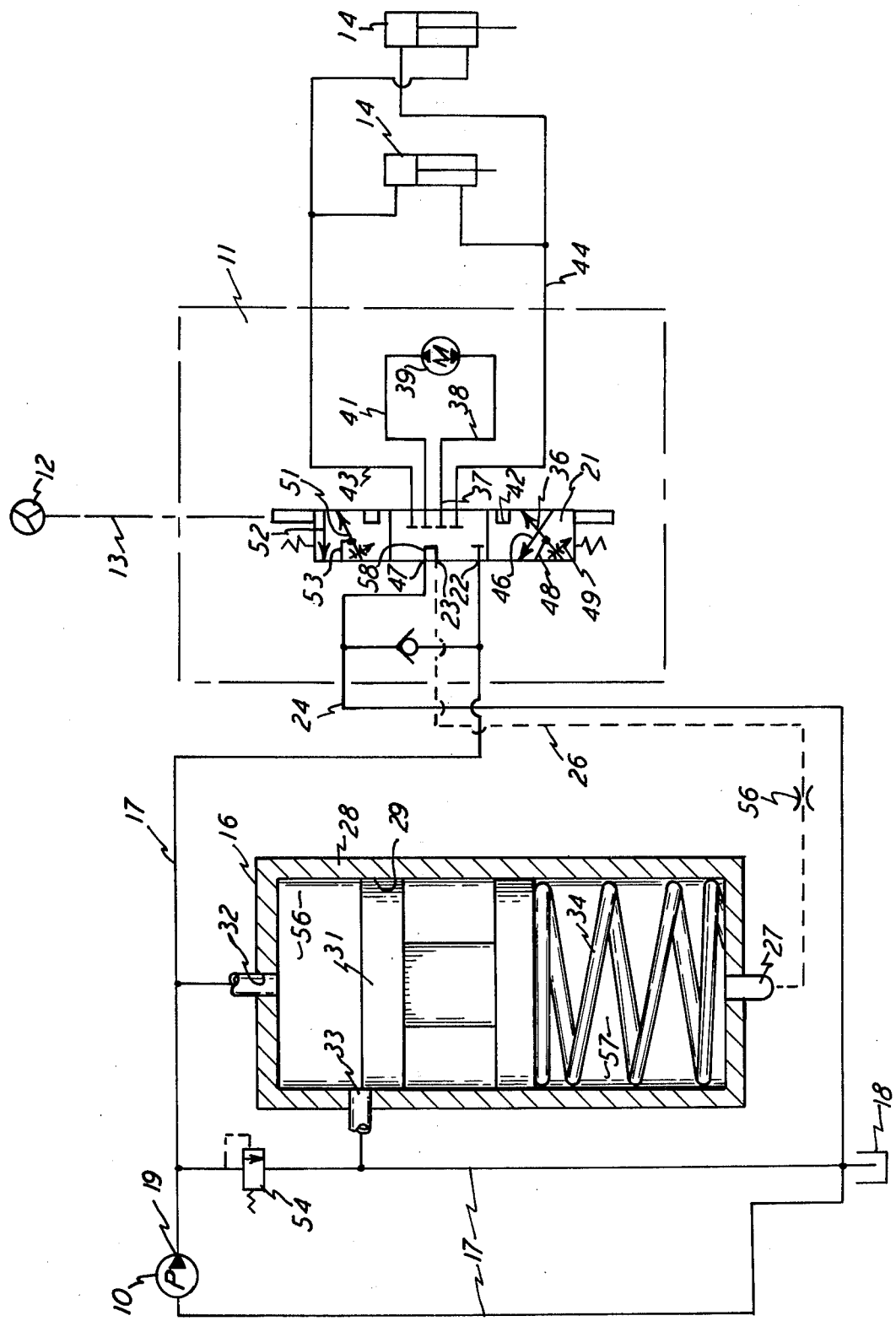

HYDRAULIC LOAD-SENSING SYSTEM

This invention relates to a hydraulic load-sensing system, and, more particularly, this invention is applicable to a vehicle power steering system such that the control valve has a constant hydraulic pressure drop across itself, for effecting smooth and linear change in the operation of the system.

BACKGROUND OF THE INVENTION

The present invention is particularly suitable for power steering systems of vehicles, such as tractors or the like, and it is therefore described in that context. In this regard, the concern and problem relate to attempts to effect a smooth and linear change in the flow of fluid in the system and to thereby avoid jerky steering response. In this respect, the invention of the present hydraulic system is arranged to sense the load on the system and to automatically respond to the load which is actually variable or changing, and the final result is to have the entire system smooth in its operation and completely capable of producing the necessary force to overcome the resistance and perform the work desired.

In achieving the aforementioned, and in providing the hydraulic system of this invention, the present system is arranged so that it senses and responds to the load pressure during actuation, such as during the steering of a vehicle, and it also senses and responds to the return hydraulic pressure when the system is in a neutral condition. The result is that the operating or main valve of the system always has a constant pressure drop across it, and thus smooth and precise hydraulic operation is achieved. Accordingly, the main or metering valve will have better metering characteristics, that is, it will have smoother and more linear change in flow for each change in the valve position, and this is true since the pressure across the valve, that is from inlet to the outlet, can be and is a constant value. In achieving these objectives, the main or metering valve has a pilot port which is internally connected to the valve outlet leading to the load-responsive actuator, and thus the hydraulic pressure at the pilot port is actually the load pressure. That pressure is communicated to a compensator which is hydraulically connected to a fixed displacement hydraulic pump, and the compensator responds to the pilot port hydraulic pressure to thereby control the pump outlet pressure and accordingly effect the constant pressure drop across the metering valve, as mentioned above.

Still further, the present invention provides a hydraulic load-sensing system which is particularly useful for hydraulic steering apparatus in a vehicle or the like, and with the system being reliable and sensitive and precise, and with the system requiring only a minimum of elements and without any of the elements being complex and unreliable.

Still further, the present invention provides a load-sensing hydraulic system wherein the power to operate the system is only a minimum, such as only the power actually required, and the hydraulic fluid is therefore not unduly heated, and the prime mover is not operating beyond the requirements for the actual production of constructive effort by the system. Also, where the present system is used for a power steering system of a vehicle, the load pressure changes, such as might be caused by the vehicle encountering an obstacle while steering, will be sensed in the system and the system will respond to the pressure changes to effect efficient action and to accomplish the aforementioned desirable results. Also, where the pressure drop across the metering valve is a constant, accomplished as disclosed herein and as mentioned above, the rate at which the steering cylinders of a hydraulic system employed in power steering of a vehicle, is a function only of the rate at which the steering wheel itself is turned, and the load on the system will have no effect on the steering, at least up to the limit of a pressure relief valve which may be employed in the system.

Still further, the present invention provides a hydraulic system of a load-sensing type which may be adjusted to thereby control the time required for the system to respond to changes in the load on the system. Also, in the hydraulic system of this invention, all of the output of the hydraulic pump is bypassed, except for the exact amount of hydraulic fluid required by the rate at which the metering or steering valve itself is turned.

Other objects and advantages will become apparent upon reading the following description in light of the accompanying drawing.

BRIEF DESCRIPTION OF THE DRAWING

The lone drawing FIGURE shows a graphical presentation of the hydraulic system and the elements therein, according to this invention.

DETAILED DESCRIPTION OF THE PREFERRED EMBODIMENT

The drawing shows the hydraulic system to include the elements of a fixed displacement fluid pump 10 and a closed center load-sensing steering valve unit 11 which is under the control of the usual vehicle steering wheel 12 indicated connected to the interior of the valve by means of the dot-dash line 13. The drawing also shows the usual steering wheel cylinders 14 having the usual and well-understood arrangement and connections. The system, as described or mentioned to this point, is conventional and is accordingly well understood by anyone skilled in the art, and it is also similar to the system disclosed in U.S. Pat. application Ser. No. 549,835, filed Feb. 13, 1975 and showing a hydraulic system with a pump and a steering valve and steering controls and the steering cylinders, as mentioned above.

A system of this invention incorporates an unloading valve or compensator 16, and it will also be seen that the several elements mentioned are interconnected by means of the solid single lines designated 17 and representing hydraulic lines or hoses or connections extending between the elements described. Also, a tank or reservoir is designated 18, and of course the indicated hydraulic lines 17 extend to the reservoir 18 and to the pump 10 which receives a supply of hydraulic fluid or oil from the reservoir 18, all in the well-known arrangement and manner.

Thus, the pump 10 has an outlet indicated at 19 and connected with the line 17 extending to the valve unit 11 and specifically extending to the spool 21 of the unit 11. The spool 21 is shown to be in the neutral position, and it has an inlet port 22 which is shown connected with the line 17 in the shown neutral position. Also, the valve portion of the unit 11 has a pilot port 23 which is connected to a hydraulic return line 24 when the spool 21 is in the shown neutral position, and there is a pilot or sensing line 26 in communication with the port 23 and extending to an inlet connection 27 of the unloading valve 16, and the line 26 is shown to be dotted for best indication and display of that line.

The compensator or unloading valve 16 has a housing 28 which has an interior chamber 29 slidably receiving a spool-shaped valve closure or movable member 31. The housing 28 also has a fluid inlet 32 and a fluid outlet 33, and the inlet 32 and the outlet 33 are suitably hydraulically connected to the hydraulic lines 17, as shown. Also, the compensator 16 has a compression spring 34 disposed therein and active on the spool 31 to urge the spool upwardly, as seen in the drawing. With that arrangement, the output of the pump 10 is directed to the compensator inlet 32 and against the spool 31, and, depending upon the axial position of the spool 31 in the housing 28, the outlet 33 is open or partially opened or even closed by the closure of spool 31. The fluid pressure in the sensing line 26 is presented to the interior of the housing 28 through the opening 27, and that sensed fluid urges the spool 31 upwardly, as seen in the drawing and therefore urges it in the same direction that the spring 34 urges the spool 31. With the spool 21 in the neutral position described and shown, the tank pressure is the pressure which is sensed in the line 26 and is applied to the spool 31 in the direction of the force of the spring 34 on the spool 31. Therefore, the pressure from the pump 10 on the other end of the spool 31 through the inlet 32 is in excess of the tank pressure by the amount of force exerted by the spring 34 on the spool 31. Accordingly, some of the output of the pump 10 will pass through the outlet 33 and return to the tank 18, and the remainder of the output of the pump 10 is available for presentation to the spool 21.

Next, if the spool 21 were actuated, by means of the steering wheel 12, to a position where the spool passageway 36 was presented in flow communication with the inlet at 22, then the passageway 36 would communication with the valve unit outlet at 37 and present fluid pressure in the line 38 and through the assist motor 39 and back to the line 41 and then to the fluid passageway loop 42 and to the line 43 and thus to the cylinders 14. The return of flow would go through the fluid line 44 and into the valve passageway 46 which would present the fluid to the valve outlet passageway 47 and thus to the return line 24. With that setting of the spool 21, the cylinders 14 would be actuated for the usual and desired power steering of the vehicle wheels (not shown) in the usual and well-known manner. It will also be noticed and understood that the spool 21 has a fluid passageway 48 which is in communication with the passageway 36 and which flow communicates with the pilot port 23 when the spool 21 is shifted to the position just described. Further, the spool 21 has the usual fluid metering arrangement as conventionally indicated at 49, and, with this arrangement, the fluid pressure at the actuator or cylinder point of connection relative to the spool 21, and that is shown as the connection of the passageway 48 with the line 36 which is extending to the valve outlet 37, the pilot port 23 is exposed to and thus senses the fluid pressure at the actuator or steering cylinders 14. The load or cylinder fluid pressure sensed at pilot port 23 is of course relayed through the line 26 and to the compensator 16, and again the pump 10 will then respond, according to the setting of the spool 31 by means of the force of the pressure in the line 26 and the spring 34, so that the output of the pump 10 is of a value that the fluid pressure drop across the spool 21 is a desired constant value, regardless of the load pressure at the actuator or cylinders 14.

Accordingly, the hydraulic pressure at the pilot port 23 is the load hydraulic pressure, and this pressure is transferred to the spring chamber of the compensator 16 through the connection or opening 27. Since the compensator 16 operates on the force balancing principle, the force caused by the pump 10 at the inlet 32 will be equal to the total force caused by the spring 34 and the pilot pressure acting along with the spring 34 and in the same direction as the spring forces on the spool 31. Thus the spool 31 will move to a point that the oil passing to the return port 33 is restricted such that the discharge of the pump 10 is higher than the pilot or load pressure by an amount equal to the spring force. When the load pressure raises or lowers, the pump pressure will also raise or lower by an equal amount. Thus the pressure across the metering spool 21 is always constant, as desired, and this produces accuracy, smoothness, precision and the like in the steering action.

The spool 21 also shows a fluid passageway 51 for passing fluid from the pump to the cylinders 14, it shows a return passageway 52, and it shows a passageway 53 which interconnects the actuator or cylinder load pressure with the pilot port 23, as described in connection with the passageway 48. Thus the steering action can be in the usual two directions.

Accordingly, when steering action occurs by turning the steering wheel 12, a fluid metering area in the spool 21 is opened from the valve inlet 22 to the selected outlet for the actuator or cylinders 14. Also, the cylinder port or outlet is connected to the pilot port, and, with the sensing of the pressure by the line 26 and the actuation and operation of the compensator 16, as described, there is always a constant pressure drop across the metering valve or spool 21, and a certain flow is established to the actuator or cylinders 14. This flow is determined solely by the size of the metering areas of the spool 21, and the metering areas are in turn established by the rate at which the steering wheel 12 is turned. If the load pressure changes, such as might occur by hitting an obstacle while steering, the pilot pressure will sense the new load which will in turn cause the pressure of the pump 10 to change by an equal amount, keeping the pressure drop across the metering area of the spool 21 at a constant value. Thus the rate at which the steering cylinders move is a function only of the rate at which the steering wheel is turned, and the load itself will have no effect on the steering, up to the limit of a pressure relief valve 54 which connects between the pump outlet 19 and the reservoir 18 and which therefore permits the pump 10 to bypass the compensator 16. Accordingly, smooth and precise steering is possible.

Also, the response of the entire system may be adjusted by a dampening orifice or restrictor 56 in the sensing line 26, and the restrictor 56 therefore controls the time required for the compensator 16 to react to any pressure change as described above.

With this arrangement, all of the flow from the pump 10 is bypassed through the compensator 16, except for the exact amount required in accordance with the rate at which the steering valve or spool 21 is being turned by the steering wheel 12. The steering valve 21 always has a constant pressure drop across it, and there is not a waste of energy and an undue heating of the oil and the desirable result of smooth and precise steering are achieved.

It will also be seen and understood by one skilled in the art that the flow through the compensator outlet 33 could be directed to unshown hydraulic units for powering same, and thus the steering system would have the desirable results disclosed and would have priority over the output of hydraulic fluid to the unshown elements which could be connected to the system. In actuality, the compensator chamber 29 has two chambers or sections 56 and 57, with the section 56 being exposed to the output of the pump 10 and with the section 57 being exposed to the pilot pressure from the line 26, as described. Also, the spool 21 has the fluid passageway designated 58 for flow communication between the pilot port 23 and the spool valve outlet 47 in the shown neutral position of the spool 21.

What is claimed is:

1. A hydraulic load-sensing system, comprising a pump, a valve having fluid passageways extending therethrough and with a fluid inlet and a fluid outlet at opposite ends of one of said passageways, a hydraulic load actuator member, hydraulic lines interconnecting all the aforesaid into the system and with said pump being hydraulically connected with said valve inlet and with said load actuator member being hydraulically connected with said valve outlet, said valve having a hydraulic sensing port hydraulically connected with said valve outlet for sensing hydraulic pressure at said valve outlet, a hydraulic pressure compensator having a valve member and two hydraulic chambers on operatively opposite sides of said valve member and with said chambers being respectively hydraulically connected to the outlet of said pump and to said sensing port to have the respective hydraulic pressures applied to said valve member, a biasing member included in said compensator and operative on said valve member urging same thereon in the direction of hydraulic force created thereon from the fluid related to said sensing port, said compensator having a hydraulic outlet in fluid-flow communication with the one of said chambers connected with said pump, said valve member being disposed and operable for controlling fluid flow through said compensator outlet and thereby control the hydraulic pressure in said one chamber in accordance with the hydraulic pressure drop across said valve from said valve inlet to said valve outlet.

2. The hydraulic load-sensing system as claimed in claim 1, wherein said actuator is a vehicle hydraulic steering cylinder.

3. The hydraulic load-sensing system as claimed in claim 1, wherein said valve is arranged with a fluid passageway interconnected between said inlet and said sensing port in one operational position of said valve and that position being one where the hydraulic fluid is blocked from passing to said valve outlet and thusly being the neutral position.

4. The hydraulic load-sensing system as claimed in claim 1, including a hydraulic pressure relief valve fluid-flow connected with said pump outlet for relieving hydraulic pressure at said pump outlet.

5. The hydraulic load-sensing system as claimed in claim 1, including a hydraulic line fluid-flow connected between said valve sensing port and said compensator to present the hydraulic connection therebetween, and a fluid-flow restrictor in the last-mentioned hydraulic line for limiting fluid flow to said compensator.

6. The hydraulic load-sensing system as claimed in claim 5, including a hydraulic pressure relief valve fluid-flow connected with said pump outlet for relieving hydraulic pressure at said pump outlet.

7. A hydraulic load-sensing system, comprising a pump, a valve having fluid passageways extending therethrough and with a fluid inlet and a fluid outlet at opposite ends of one of said passageways, a hydraulic load actuator member, hydraulic lines interconnecting all the aforesaid into the system and with said pump being hydraulically connected with said valve inlet and with said load actuator member being hydraulically connected with said valve outlet, said valve having a hydraulic sensing port hydraulically connected with said valve outlet for sensing hydraulic pressure at said valve outlet, a pump unloading valve with a fluid inlet and a fluid outlet and a valve closure member movable therein for governing fluid flow through said unloading valve and with said fluid inlet connected with said hydraulic line between said pump and the first-mentioned said valve, and a biasing member operable on said closure member for urging the latter to a position to reduce the flow of fluid through said unloading valve, and a fluid connection between said sensing port and said unloading valve and arranged to apply hydraulic pressure to said closure member for the same urging of the latter as applied thereto by said biasing member.

8. A hydraulic system for a constant pressure, comprising a hydraulic pump and a hydraulic valve with a hydraulic inlet and a hydraulic outlet, and a hydraulic responsive unit, all hydraulically connected together with main hydraulic lines and for supplying hydraulic pressure from said pump and to said responsive unit, a spring-biased hydraulic pressure compensator having a hydraulic chamber and a movable member disposed in said chamber and with a spring biasing said movable member in one direction in said chamber, an additional hydraulic line connected intermediate said pump and said compensator and said valve for introducing hydraulic pressure from said pump and into said chamber at the side of said movable member toward said one direction to apply a force against the force of said spring, said compensator having a fluid outlet in fluid flow with said chamber and intersecting the path of movement of said movable member and being arranged to have said movable member control the flow of fluid through said outlet, said valve having a fluid passageway in flow communication between said inlet and said outlet of said valve, and a sensing hydraulic line connected between said valve fluid passageway and said compensator for introducing hydraulic pressure from said valve and into said chamber at the side of said movable member opposite from said one direction to apply a force against said movable member in same direction that said spring applies a force thereagainst, and thereby create a constant hydraulic pressure drop across said valve between said inlet and said outlet of said valve.

* * * * *